(12) United States Patent
Schmidt

(10) Patent No.: US 7,759,124 B2
(45) Date of Patent: Jul. 20, 2010

(54) BLANCHER WITH AUTOMATED PROCESS CONTROL

(75) Inventor: Frank J. Schmidt, Lisle, IL (US)

(73) Assignee: Crown Packaging Technology, Inc., Alsip, IL (US)

(*) Notice: Subject to any disclaimer, the term of this patent is extended or adjusted under 35 U.S.C. 154(b) by 617 days.

(21) Appl. No.: 11/764,199

(22) Filed: Jun. 16, 2007

(65) Prior Publication Data
US 2008/0311664 A1 Dec. 18, 2008

(51) Int. Cl.
*G01N 35/08* (2006.01)
*G01N 21/00* (2006.01)
*A23L 3/18* (2006.01)

(52) U.S. Cl. ............... 436/55; 422/62; 99/330; 99/443 C; 99/477; 99/534; 99/536; 426/509; 426/510; 436/50

(58) Field of Classification Search ........... 436/50; 99/330
See application file for complete search history.

(56) References Cited

U.S. PATENT DOCUMENTS

| | | | |
|---|---|---|---|
| 4,473,591 A | 9/1984 | Segner | |
| 4,525,370 A | 6/1985 | Parkes | |
| 4,702,161 A | 10/1987 | Andersen | |
| 5,289,759 A * | 3/1994 | Hufford | 99/330 |
| 6,004,601 A | 12/1999 | Donato | |
| 6,263,785 B1 * | 7/2001 | Zittel | 99/348 |
| 7,069,841 B2 * | 7/2006 | Ledet et al. | 99/386 |
| 2003/0000842 A1 * | 1/2003 | Matejat et al. | 205/82 |

* cited by examiner

*Primary Examiner*—Jill Warden
*Assistant Examiner*—Jennifer Wecker
(74) *Attorney, Agent, or Firm*—Knoble Yoshida & Dunleavy, LLC

(57) ABSTRACT

A method of operating a blanching system includes steps of automatically sampling a blanching solution and mixing the sampled blanching solution with a reagent that is formulated to change at least one property according to a concentration of a metal ion in the blanching solution. This property is automatically sensed with an automated sensor and a controller is used to automatically control a concentration of metal ions in the blanching solution in response to a signal that is received from said automated sensor.

20 Claims, 2 Drawing Sheets

BLANCHER WITH AUTOMATED PROCESS CONTROL

BACKGROUND OF THE INVENTION

1. Field of the Invention

This invention relates to steam cookers and blanchers for cooking and blanching a continuous or semi-continuous flow of bulk food particles. More specifically, this invention relates to an automated control process and system for such equipment.

2. Description of the Related Technology

In the conventional process of canning green vegetables such as green beans, peas and spinach, the vegetable after being washed, is subjected to a blanching operation of 3 to 5 minutes duration. The primary purpose of the blanching is to activate enzymes, such as pectin methyl esterase and expel air which would otherwise result in off-flavors. After the blanching operation, the green vegetables are filled in cans, covered with a brine solution consisting of sugar and/or salt, and the cans are thereafter sealed and sterilized.

Such methods of canning vegetables have the disadvantage that the canned product does not retain the fresh green color of the growing vegetable, but assumes a dull yellow-olive color which is unpleasant to the eye and, consequently, is not as appetizing as it might be if the fresh green color were retained. The undesirable change in color is due to hydrolytic and oxidative changes which accompany the sterilization of commercially canned green vegetables. In many cases, these degradative changes in canned vegetables are accelerated by the production of organic acids during thermal processing. Thus, the normal pH value for the fluids expressed from raw peas is about 6.6 to 7.0 whereas the product after sterilization ranges from 5.8 to 6.4. This decrease in pH constitutes an increase in acidity which causes the destruction of the natural green pigment during thermal processing and subsequent storage, i.e., the degradation of green colored chlorophyll to yellow-olive colored pheophytin.

Early processes for the retention of green color in canned green vegetables generally required an additive compound to achieve the color retention (i.e., to prevent the conversion of chlorophyll to yellow-olive colored pheophytin). These additives can be classified into two principal groups (1) alkalizing or alkalizing-buffering agents such as the hydroxides and carbonates of alkali and alkaline earth metals such as sodium, calcium and magnesium or (2) metallic salts such as the chlorides and acetates of zinc and copper.

The addition of zinc or copper salts for the retention of green color in canned vegetables has been reported in several prior art processes. For example, U.S. Pat. No. 4,473,591 to Segner et al. discloses a method having reduced processing time for the preservation of green color in vegetables. Examples are directed to treatments of green beans, green peas, and spinach, which are separately blanched in a zinc or copper ion solution for 5 to 6 minutes, after which they are packed into cans and sterilized. Blanch water metal ion concentrations of 50 to 1000 ppm are employed in this method.

In the large-scale commercial use of such systems, it is important to ensure that the aqueous concentration of metal ions is maintained within a desired process range. Conventionally, this is ensured by having the operator of the system periodically manually test the concentration of the metal ion within the blancher fluid and adjust the concentration level by adding additional metal ions and/or fluid as may be required. While this process has been used relatively effectively for many years, it is subject to human error and introduces potential quality control issues to the blanching process. A need exists for a system and method that permits a commercial blanching system to automatically monitor and adjust the composition of the blanching fluid as may be required with a minimum of human oversight and intervention.

SUMMARY OF THE INVENTION

Accordingly, it is an object of the invention to provide a system and a method that permits a commercial blanching system to automatically monitor and adjust the composition of the blanching fluid as may be required with a minimum of human oversight and intervention.

In order to achieve the above and other objects of the invention, an automated blanching system according to a first aspect of the invention includes a blancher that is constructed and arranged to blanch vegetables using a blanching solution that contains a metal ion; a metal ion supplier that is configured to permit additional metal ions to be added to the blanching solution; a testing chamber; a conduit for supplying a sample of the blanching solution to the testing chamber; reagent supplying means for supplying a reagent to the testing chamber, the reagent being formulated to change at least one property according to a concentration of the metal ion in the blanching solution; an automated sensor for sensing the property; and an automated controller that is in communication with the automated sensor, the automated controller being constructed and arranged to automatically instruct the metal ion supplier to add additional metal ions to the blanching solution in response to a signal from the automated sensor. In addition, this automated controller is directed to control the concentration of metal ion in the blancher, calibrate itself, error check itself, etc. by means of software written for that purpose.

According to a second aspect of the invention, a method of operating a blanching system includes steps of automatically sampling blanching solution; mixing the sampled blanching solution with a reagent that is formulated to change at least one property according to a concentration of a metal ion in the blanching solution; automatically sensing the property with an automated sensor; and automatically controlling with a controller a concentration of metal ions in the blanching solution in response to a signal that is received from the automated sensor.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
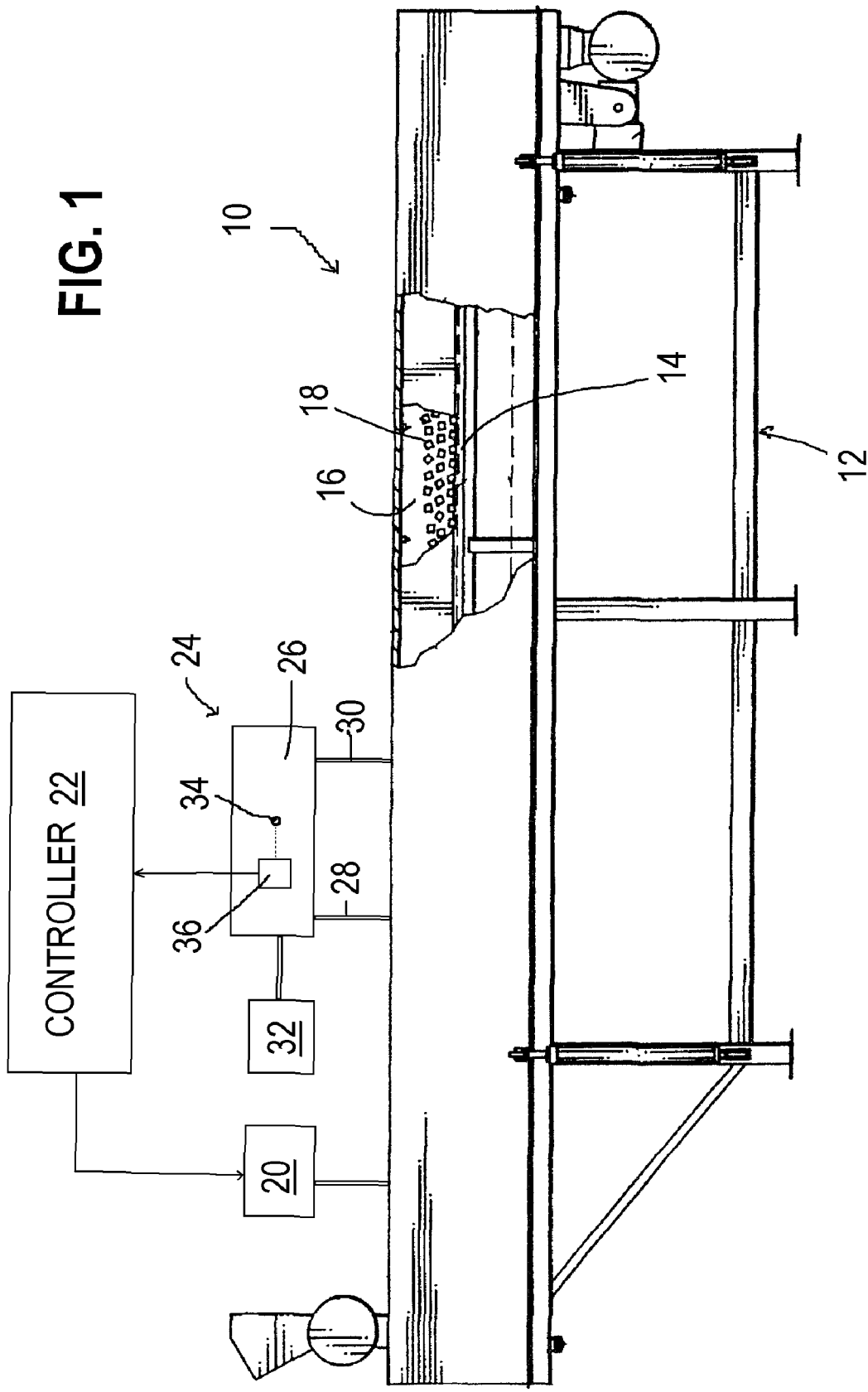
FIG. 1 is a diagrammatical depiction of a continuous blanching system that is constructed according to a preferred embodiment of the invention.
Figure 2:
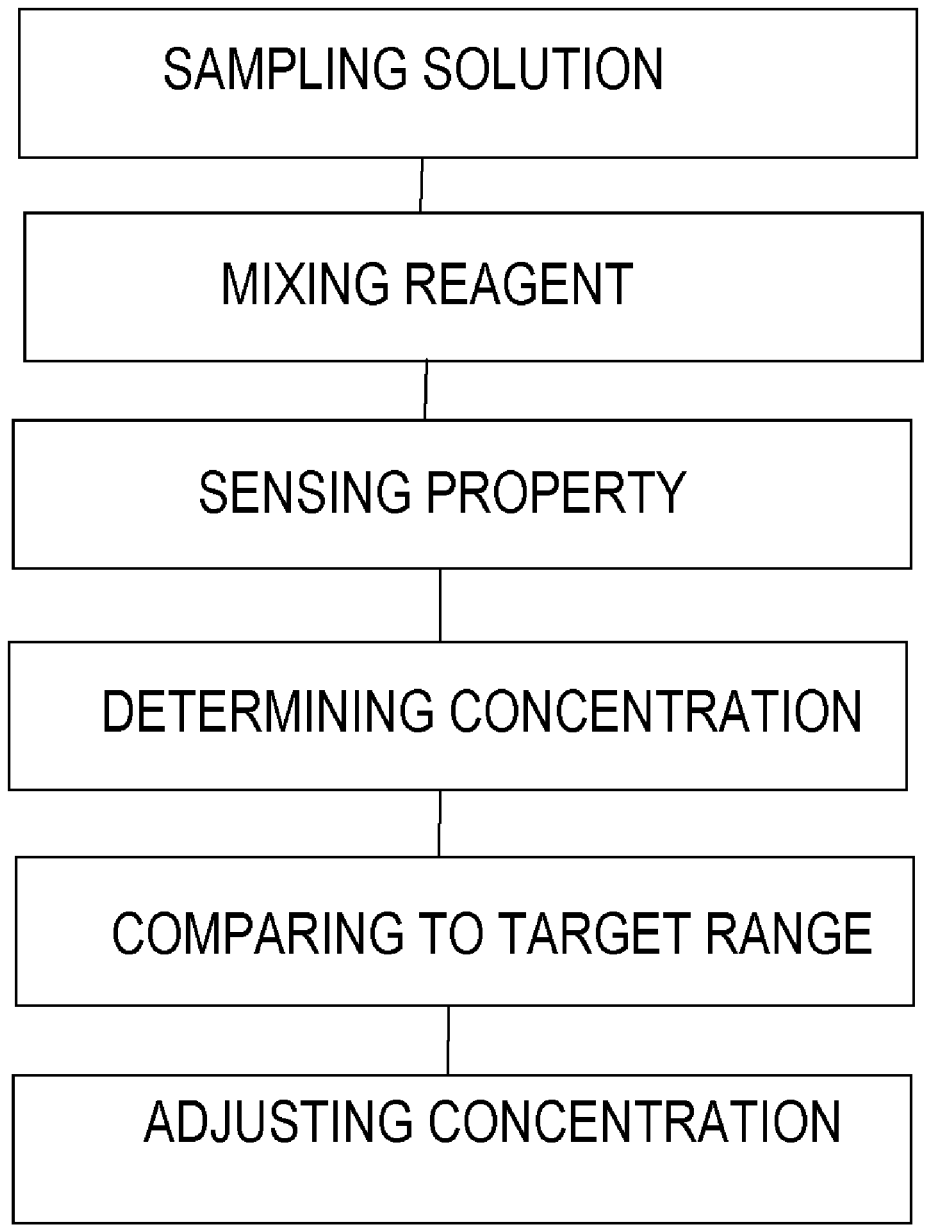
FIG. 2 is a flow diagram depicting a method that is performed according to a preferred embodiment of the invention.

Referring now to the drawings, wherein like reference numerals designate corresponding structure throughout the views, and referring in particular to FIG. 1, a continuous blanching system 10 that is constructed according to a preferred embodiment of the invention includes a frame 12 and an endless conveyor 14 that is constructed and arranged to convey a continuous flow of bulk food particles such as vegetables 18 through a steaming or blanching chamber 16 and conventional fashion. The mechanical details of such a continuous blanching system 10 except as is described below are well known in the industry.

As is conventional, continuous blanching system 10 utilizes a blanching fluid which is an aqueous solution that is circulated throughout the continuous blanching system 10 and that my be used to generate steam that is provided to the blanching chamber 16. This steam is then condensed and recirculated for reuse by the system.

Continuous blanching system 10 preferably includes a metal ion supplier 20 for supplying a metal ion, which is preferably zinc, into the blanching fluid of the continuous blanching system 10. Metal ion supplier 20 in the preferred embodiment is controlled by an electronic controller 22, as will be described in greater detail below.

A sensing system 24 is provided for sensing the metal ion concentration within the blanching fluid that is being used by the continuous blanching system 10. Sensing system 24 is preferably a continuous flow chemical analyzer that in the preferred embodiment includes a testing chamber 26 into which a continuous sampling of blanching fluid is provided via a supply conduit 28. A bypass line 30 is also provided to return excess blancher fluid to the blancher.

A device 32 is also provided for introducing a chemical reagent into the testing chamber 26. The chemical reagent is formulated to change at least one property according to a concentration of the metal ion in the blanching fluid. In the preferred embodiment, the chemical reagent is formulated to change color according to the concentration of zinc in the blanching fluid. A suitable reagent for this purpose is zincon, which is widely commercially available.

Sensing system 24 further preferably includes a light source 34, which is preferably a light emitting diode or LED. Sensing system 24 further includes an optical sensor 36 that is spaced a controlled distance away from the light source 34 and that is configured to produce a signal that is transmitted to the controller 22. The strength of the signal that is transmitted to the controller 22 is inversely proportional to the concentration of zinc within the testing chamber 26 at a given concentration level of the reagent 32, because the coloration of the solution within the testing chamber 26 becomes darker at higher levels of the reagent 32 and at higher levels of zinc. In the preferred embodiment, the light source 34 is constructed and arranged to admit a red light, and the reagent is selected to give the solution within the testing chamber 26 a bluish coloration, the intensity of which again depends upon the concentration of zinc in the blancher fluid. The bluish coloration of the solution effectively attenuates the reddish light, reducing the amount of light that is received by the optical sensor 36 in dependence upon the darkness of the bluish coloration.

The controller 22 preferably analyzes the signals that are received from the optical sensor 36 by comparing a log of the signal to a predetermined standard, which is representative of a target minimum concentration of zinc within the blanching fluid. When the controller 22 determines that an insufficient concentration of zinc exists within the blanching fluid, the metal ion supplier 20 is instructed by the controller 22 to inject a controlled amount of additional zinc into the blanching fluid. This quantity of zinc added is preferably determined by a set of rules which is implemented by software running on the controller 22. The controller 22 further preferably executes software that calibrates the chemical analysis of zinc or other metal ions; sets timing parameters for the chemical analysis; provides for statistical analysis of the chemical data; provides for error checking to assure that the data obtained are valid; provides a data file which records all relevant data and error conditions; provides a series of user adjustable tables which enable user selectable set points, user defined error checking and reporting, and user adjustable zinc/metal ion control schemes; provides an alarm output which will advise a user that the integrity of the data has been compromised; and provides a means to continually update the calibration curve to assure valid data.

In addition, the signal that is received by the controller 22 from the optical sensor 36 may be analyzed to determine whether the concentration of zinc within the blanching fluid exceeds a target maximum concentration of zinc. The controller 22 will do this by comparing a log of the signal to a second predetermined standard. If the controller 22 determines that the target maximum concentration of zinc has been exceeded, it will instruct the metal ion supplier (20) to modify the rate of addition of metal ion into the blancher fluid.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An automated blanching system, comprising:
a blancher that is constructed and arranged to blanch vegetables using a blanching solution that contains a metal ion;
a metal ion supplier that is configured to permit additional metal ions to be added to said blanching solution;
a testing chamber;
a conduit for supplying a sample of said blanching solution to said testing chamber;
reagent supply means for supplying a reagent to said testing chamber, said reagent being formulated to change at least one property according to a concentration of said metal ion in said blanching solution;
an automated sensor for sensing said property; and
an automated controller that is in communication with said automated sensor, said automated controller being constructed and arranged to automatically instruct said metal ion supplier to add additional metal ions to said blanching solution in response to a signal from said automated sensor.

2. An automated blanching system according to claim 1, wherein said metal ion comprises zinc.

3. An automated blanching system according to claim 2, wherein said reagent is formulated to change color according to a concentration of said zinc in said blanching solution.

4. An automated blanching system according to claim 1, wherein said reagent is formulated to change color according to a concentration of said metal ion in said blanching solution.

5. An automated blanching system according to claim 1, wherein said testing chamber comprises a continuous flow chemical analyzer.

6. An automated blanching system according to claim 4, wherein said automated sensor comprises an optical sensor.

7. An automated blanching system according to claim 6, wherein said optical sensor comprises a light source and a light sensor for sensing light from said light source that has been attenuated by said mixed solution of blanching solution and reagent, said light sensor producing a signal that is communicated to said automated controller.

8. An automated blanching system according to claim 1, wherein said automated controller is constructed and arranged to automatically instruct said metal ion supplier to add additional metal ions to said blanching solution when a concentration of said metal ions in said mixed solution of blanching solution and reagent falls beneath a predetermined minimum or will soon reach a state in which the concentration of metal ion will fall below a predetermined minimum.

9. An automated blanching system according to claim 7, wherein said automated controller is constructed and arranged to compare a log of said signal to a predetermined standard.

10. An automated blanching system according to claim 1, wherein said automated sensor produces a signal that is communicated to said automated controller and wherein said automated controller is constructed and arranged to compare a log of said signal to a predetermined standard.

11. A method of operating a blanching system, comprising:
automatically sampling blanching solution;
mixing said sampled blanching solution with a reagent that is formulated to change at least one property according to a concentration of a metal ion in the blanching solution;
automatically sensing said property with a automated sensor; and
automatically controlling with a controller a concentration of metal ions in said blanching solution in response to a signal that is received from said automated sensor.

12. A method of operating a blanching system according to claim 11, wherein said metal ion comprises zinc.

13. A method of operating a blanching system according to claim 12, wherein said reagent is formulated to change color according to a concentration of said zinc in said blanching solution.

14. A method of operating a blanching system according to claim 11, wherein said reagent is formulated to change color according to a concentration of said metal ion in said blanching solution.

15. A method of operating a blanching system according to claim 11, wherein said property is sensed with a continuous flow chemical analyzer.

16. A method of operating a blanching system according to claim 14, wherein said automated sensor comprises an optical sensor.

17. A method of operating a blanching system according to claim 16, wherein said optical sensor comprises a light source and a light sensor for sensing light from said light source that has been attenuated by said mixed solution of blanching solution and reagent, said light sensor producing a signal that is communicated to said automated controller.

18. A method of operating a blanching system according to claim 11, wherein said automated controller is constructed and arranged to automatically instruct said metal ion supplier to add additional metal ions to said blanching solution when a concentration of said metal ions in said mixed solution of blanching solution and reagent falls beneath a predetermined minimum or is predicted [(by Veri-Green software)] to drop below a predetermined minimum.

19. A method of operating a blanching system according to claim 17, wherein said automated controller is constructed and arranged to compare a log of said signal to a predetermined standard.

20. A method of operating a blanching system according to claim 11, wherein said automated sensor produces a signal that is communicated to said automated controller and wherein said automated controller is constructed and arranged to compare a log of said signal to a predetermined standard.

\* \* \* \* \*